United States Patent [19]

Birging et al.

[11] Patent Number: 5,196,830
[45] Date of Patent: Mar. 23, 1993

[54] APPARATUS FOR SUPERVISING OBJECTS WITH REGARD TO OVERHEATING

[76] Inventors: Torbjörn Birging, Västra Löa; Carl-Gösta Ardesjö, Vesterby Löa, both of S-714 00 Kopparberg, Sweden

[21] Appl. No.: 571,597
[22] PCT Filed: Feb. 23, 1989
[86] PCT No.: PCT/SE89/00075
 § 371 Date: Aug. 24, 1990
 § 102(e) Date: Aug. 24, 1990
[87] PCT Pub. No.: WO89/08300
 PCT Pub. Date: Sep. 8, 1989

[30] Foreign Application Priority Data
Feb. 24, 1988 [SE] Sweden ................................ 8800625

[51] Int. Cl.$^5$ .............................................. G08B 17/00
[52] U.S. Cl. ..................................... 340/584; 219/413; 374/121
[58] Field of Search ............... 340/584, 578, 664, 527, 340/502-503, 556, 691, 693; 250/338.1, 338.3, 221; 374/121-133; 219/413, 449, 502, 510-517

[56] References Cited
U.S. PATENT DOCUMENTS

| 3,700,306 | 10/1972 | Cartmell et al. | 350/341 |
| 3,893,092 | 7/1975 | Kessler | 340/503 X |
| 3,949,366 | 4/1976 | Spillar et al. | 367/199 |
| 4,161,654 | 7/1979 | Szarewicz et al. | 250/221 |
| 4,286,134 | 8/1981 | Nakata et al. | 374/121 X |
| 4,864,283 | 9/1989 | Seto | 340/502 X |

FOREIGN PATENT DOCUMENTS

| 1329828 | 9/1973 | United Kingdom | 340/578 |
| 8600179 | 1/1986 | World Int. Prop. O. | 340/578 |

Primary Examiner—Jin F. Ng
Assistant Examiner—Thomas J. Mullen, Jr.
Attorney, Agent, or Firm—Gifford, Groh, Sprinkle, Patmore and Anderson

[57] ABSTRACT

An apparatus for supervising objects, such as hot plates and electrical stoves, with regard to overheating comprises at least one detector for detecting conditions of overheating and a device controlled by the detector for delivering for instance alarm. The detector is a detector for infrared radiation arranged at a distance from the object to detect heat radiation emitted therefrom.

4 Claims, 5 Drawing Sheets

APPARATUS FOR SUPERVISING OBJECTS WITH REGARD TO OVERHEATING

FIELD OF INVENTION AND PRIOR ART

The invention is related to an apparatus for supervising objects, such as hot plates and electrical stoves, with regard to overheating, said apparatus comprising at least one detector for detecting overheating conditions and a device controlled by the detector for delivering indication, alarm and/or breaking supply of energy to the object.

Investigations illustrate that a great number of accidents occur by ignition of overheated objects. Thus, 30% of all fires in homes are, for instance, caused by electrical stoves, i.e. by the user having forgotten to turn off the stove. Even in cases where such negligence does not involve fire, other economic damage, namely destroyed hot plates and/or cooking-vessels, occurs due to overheating Injuries to persons and damages to property also occur with other types of objects, such as electrical apparatus, machines and motors, as a consequence of overheating.

As far as stoves are concerned it should be pointed out that a fire hazard may well be at hand without the hot plates being excessively heated. In cooking, ingredients are often used which may be ignited at relatively low temperatures. It would be desirable to be able to detect ignition of such ingredients.

SUMMARY OF THE INVENTION

The object of the present invention is to devise a supervising apparatus which is capable of supervising objects, such as hot plates and electrical stoves, with regard particularly to overheating, said apparatus preferably being such that the desired activity, such as alarm and/or current breaking, occurs not only on excessive heating but also when a fire or open flame occurs at temperatures of the object which have not reached excessive levels.

This object is, according to the invention, achieved by means of the features more closely defined in the appended claims.

The detector is preferably a detector for infrared radiation (IR-detector) arranged at a distance from the object for detecting heat radiation emitted therefrom. This solution gives a very simple and efficient embodiment since the detector arranged away from the object may supervise the temperature state at or adjacent to the object without being subjected to the same heating as the object. Furthermore, the detector does not only react to the temperature of the object itself, e.g. hot plates thereof, but also to possible open flames.

BRIEF DESCRIPTION OF THE DRAWINGS

With reference to the enclosed drawings, a more specific description of embodiment examples of the invention will follow hereinbelow.

In the drawings.

DETAILED DESCRIPTION OF PREFERRED EMBODIMENTS OF THE INVENTION

Figure 1:
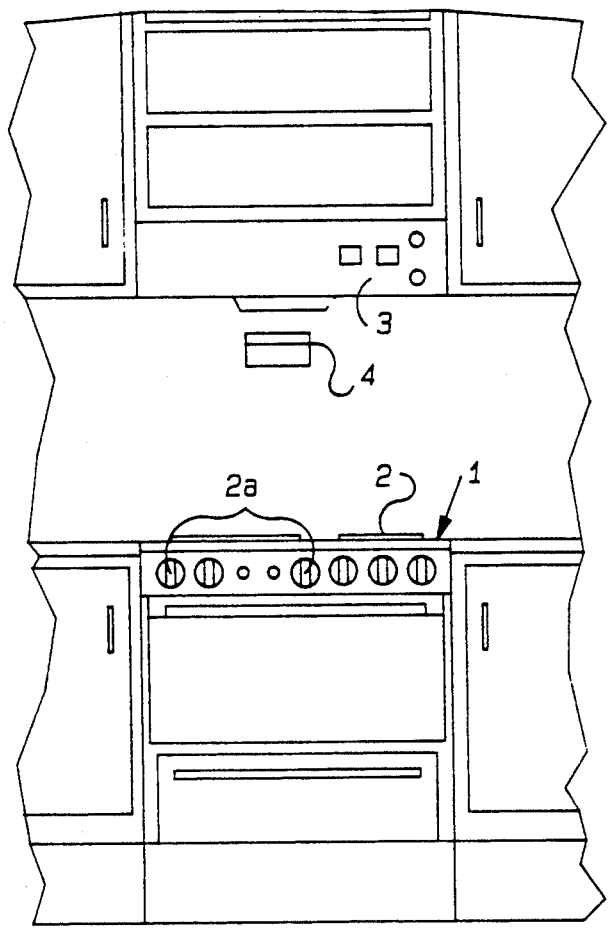
FIGS. 1 and 2 are front and side views respectively of a stove installation and a supervising apparatus installed in connection therewith.
Figure 2:
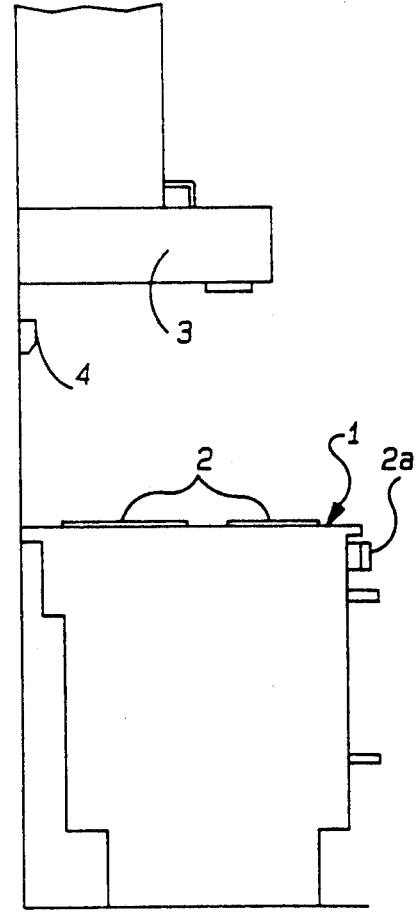

A conventional installation of an electrical stove 1 having hot plates 2 is illustrated in FIGS. 1 and 2. A fan or hood 3 for catching fumes is normally arranged above the stove. User controlled on/off switches 2a control current supply to hot plates 2.

Figure 3:
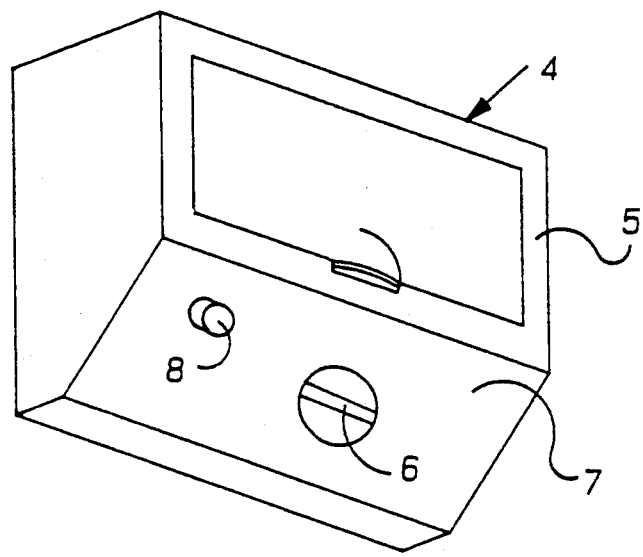
FIG. 3 is a view from the front and the side respectively of the supervising apparatus itself.

The supervising apparatus according to the invention is in FIGS. 1 and 2 indicated at 4 and illustrated at a greater scale in FIG. 3. The apparatus comprises a detector for detecting conditions of overheating and a device controlled by the detector for delivering alarm as to such conditions of overheating. These components are built into a caselike housing 5. The detector is more specifically a detector for infrared radiation (IR-detector). As appears from FIGS. 1 and 2 the apparatus 4 and accordingly the detector is intended to be arranged at a distance from the stove 1 and its hot plates 2 to detect heat radiation emitted therefrom. More specifically, device 4 is located at a level above the top plane of hot plates 2. It is suitable that the detector is located at a vertical wall surface adjacent to the stove. This vertical wall surface may be a wall surface behind the stove as illustrated in FIGS. 1 or 2 or alternatively a vertical wall surface at one side of the stove. In this way the apparatus 4 will be located displaced sidewardly relative to the center of the top surface of the stove and this causes the heat emission from the stove to influence the apparatus 4 to a minimum degree. This location of apparatus 4 causes further that it will be sidewardly displaced relative to the stream of food fumes moving upwardly towards the fan 3 or stove hood from cooking-vessels placed on the stove.

The detector is arranged within housing 5, which in a manner appearing from FIG. 3 comprises a window 6, through which incident IR-radiation may pass to the detector placed behind the window. The window 6 is arranged in an inclined wall portion 7 of the housing, the inclination of wall portion 7 being such that IR-radiation from the top side of the stove reaches window 6 and the detector placed therebehind. The wall portion 7 is in the embodiment inclined about 45° in relation to the horizontal plane. This angle is suitable for the intended location of apparatus 4 about 40 cm above the top plane of the stove.

According to a first alternative the apparatus 4 may be supplied with electrical current by means of solar cells located on housing 5 of the apparatus. These solar cells should be combined with a chargeable cell. Alternatively, the apparatus may be powered by batteries.

It is suitable to provide an indicator 8 visible exteriorly of the housing and adapted to indicate that the apparatus is operating and receives adequate current supply. The indicator is preferably a light emitting one, e.g. a light emitting diode.

As appears from FIG. 1, apparatus 4 should be located centrally behind the stove.

Figure 4:
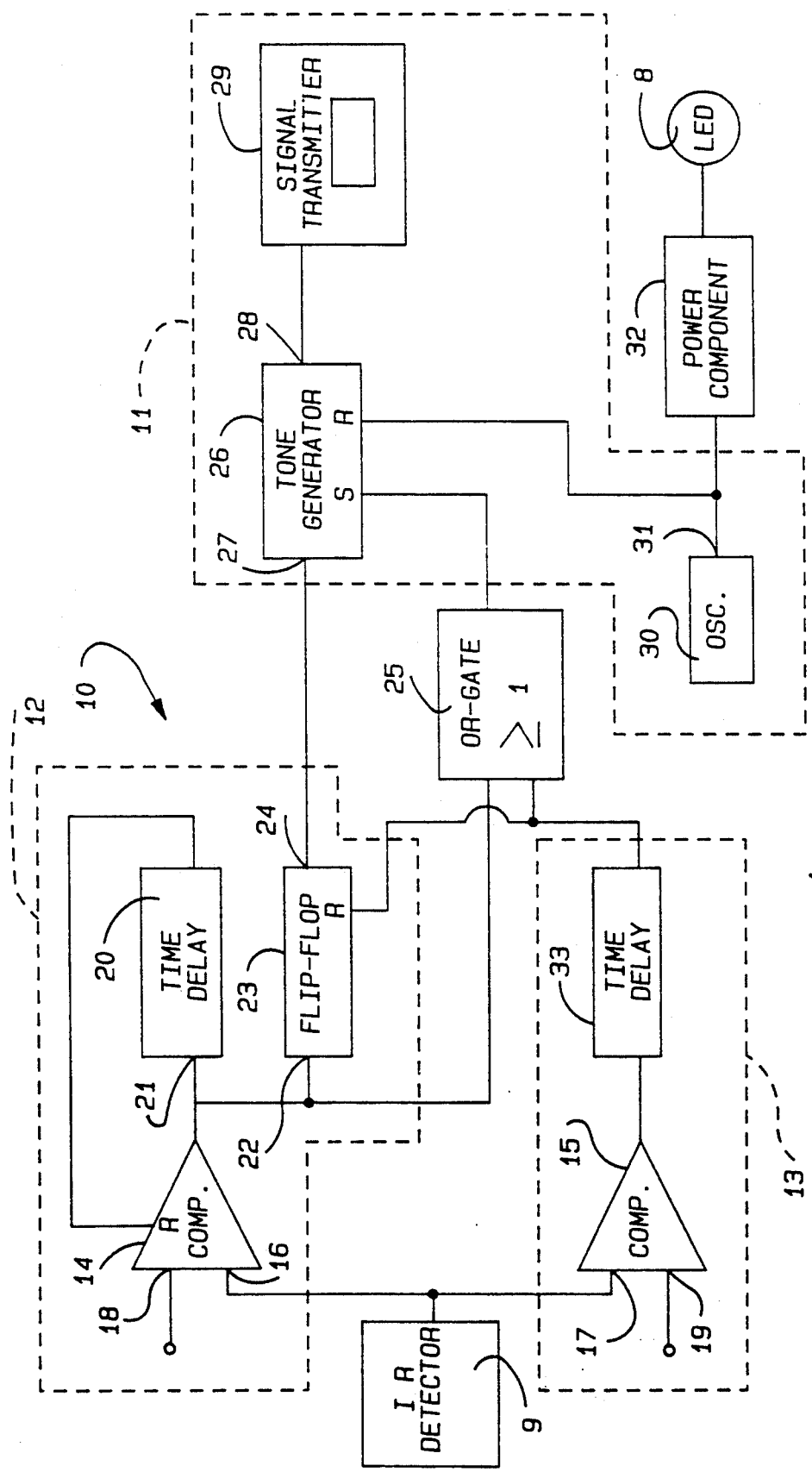
FIG. 4 is a block diagram illustrating operation and construction of the supervising apparatus.

The block diagram in FIG. 4 illustrates the electronical design of the apparatus, all components illustrated in FIG. 4 being built into housing 5 of the apparatus. The IR-detector is denoted 9 and is preferably arranged to deliver an electrical output signal in relation to measured infrared radiation within the wave length area 1-3 micrometer. The detector may be of the photo conductive cell type, i.e. a cell with a semi-conductor material, the resistance of which is changed when incident photons lift electrons into the conduction band. When a voltage is applied the semi-conductor material, the IR-radiation may accordingly be detected by current change. A detector of the brand Hamamatsu with a type designation P 394 has turned out to be well suited for the purpose.

An electrical control device 10 to control the alarm device 11 on basis of the output signals of the detector 9 comprises two control circuits, namely a first 12 intended to bring alarm device 11 into operation at a first temperature level at the stove and a second 13 intended to bring alarm device 11 into operation at a second, higher temperature level. The first control circuit 12 is arranged to be manually inactivatable by the user while this control circuit 12 maintains alarm device 11 in operation so that thereby this alarm operation ceases. The second control circuit 13 is arranged to be unaffectable by the user and furthermore arranged to always activate the alarm device as soon as the second temperature level has been reached independently of whether the user has inactivated the first control circuit 12 or not.

Each of the control circuits 12 and 13 comprises a comparator 14 and 15 respectively. Both of these comparators receive on inputs 16 and 17 respectively temperature dependent signals and the comparators are arranged to compare these temperature dependent signals with reference signals received on inputs 18 and 19 respectively and corresponding to the first and second temperature levels respectively.

The first control circuit 12 comprises a time delay member 20, which after inactivation by the user of this control circuit maintains this inactivation during a predetermined time period but thereafter again activates said control circuit.

The control circuit 12 comprises members, which here are formed by the comparator 14 itself, which when the IR-detector 9 is screened or shielded off from the hot plates of the stove, e.g. by means of the hand of the user, interrupt the holding of alarm device 11 in operation by means of the control circuit 12 and activate time delay member 20.

The detector 9 is in the embodiment arranged so as to deliver a signal with decreasing voltage on the output when the incident IR-radiation increases. When the voltage on the measuring input 16 of the comparator is lower than the reference voltage at 18, the output of the comparator goes "high". Comparator 14 is provided with a reset input R. When there is a "high" signal on the reset input, the output from the comparator is "low". The time delay member 20 comprises a monostable flip-flop, the input 21 of which is connected to the output of comparator 14. The flip-flop 20 is triggered when the input 21 goes from "high" to "low" and when the flip-flop has been triggered, the output, which is connected to the reset input R of comparator 14, lies "high" for about 2.5 minutes.

The output of the comparator is coupled to the input 22 of a second monostable flip-flop 23, which is triggered when its input goes from "low" to "high". When the flip-flop has been triggered, its output 24 is "high" for about 15 seconds. Furthermore, the flip-flop 23 has a reset input R. When there is a "high" signal thereon, the output 24 of the flip-flop is "low".

The output of comparator 14 is further coupled to an input of an OR-gate 25. The output thereof is connected to the signal input S of a tone generator 26. For the latter to oscillate, the signal input S must be "high". The tone generator has an input 27 for high or low effect on its output 28 so that when input 27 is high, output 28 gives a low effect and vice versa. Furthermore, the tone generator 26 has a reset input R. If there is a "high" signal thereon, output 28 of the generator ceases to oscillate.

An alarm signal transmitter 29 gives a sound signal to direct the attention of the surroundings to the fact that there is something faulty at the stove or the object in question.

An oscillator 30 oscillates and delivers a square wave with e.g. about 1 Hz on the output 31. This output is connected to the reset input R of tone generator 26 and to the input of a power component 32 operating as a monostable flip-flop with an output which may give a high current during a short time. When the input of power component 32 goes from "low" to "high" a short pulse on the output is generated, e.g. with a duration of 0.1 seconds. This pulse drives the light emitting diode 8 so that it glows strongly during a short time. Accordingly, light emitting diode 8 indicates that the apparatus is in operation and receives current supply.

The comparator 15 in control circuit 13 is so designed that when the voltage received from detector 9 on input 17 is lower than the reference voltage on input 19, the output of the comparator goes "high". The output of comparator 15 is connected to the input of a member 33 having a switching off-delaying function. When the input of member 33 goes "high", this gives immediately rise to a "high" output signal on the output of the member. However, when the input of member 33 for signals from comparator 15 goes "low" the output of member 33 is "high" for about 10 seconds and the time is prolonged with about 10 seconds each time the input goes from "high" to "low". The output of member 33 is connected both to an input of OR-gate 25 and to a reset input R of flip-flop 23. Gate 25 gives of course "high" output signal as soon as there is a high input signal on any or both of its inputs.

The operation according to FIG. 4 is as follows: if the temperature of any hot plate or cooking-vessel placed thereon increases to a level above the normal, e.g. as a consequence of the user having forgotten to switch off the hot plate in question, the detector 9 delivers a signal with decreasing voltage, which initially gives rise to a "high" output on comparator 14 since its reference input has a higher voltage than the reference input of comparator 15. The output signal from comparator 14 causes triggering of flip-flop 23, the output of which lies "high" for about 15 seconds. The tone generator 26 then emits a signal with a low effect under the same time period and accordingly also alarm signal transmitter 29 emits a sound with low effect. The operation of tone generator 26 also depends on the high output signal of comparator 14 being received by OR-gate 25, which on the signal input S of the tone generator delivers a "high" signal. After said time period of 15 seconds, the output of flip-flop 23 goes from high to low and this controls tone generator 26 to operate with a high effect and this is then also valid for alarm signal transmitter 29. The sound signal from the latter becomes pulsating due to the operation of oscillator 30 since when the output of the oscillator is high, tone generator 26 ceases to oscillate and when it is low, alarm signal transmitter 29 emits sound. When the output of oscillator 30 goes from low to high, the power component 32 is triggered so that it generates a pulse driving the light emitting diode 8. As long as oscillator 30 receives supply voltage, the light emitting diode 8 will accordingly flash.

The alarm can be shut off by ensuring that detector 9 receives reduced IR-radiation. This may for instance be carried out by the user screening the detector off from the radiation source, e.g. with the hand or by placing a cooking-vessel on the hot plate in question. This causes an increasing output signal from detector 9, which signal at a certain level makes comparator 14 to transfer from high to low on its output. When this happens, the mono flip-flop 20 is triggered and its output becomes high for about 2.5 minutes. This output maintains the reset input R of comparator 14 high, which causes the comparator to be out of operation for 2.5 minutes. The low output signal from comparator 14 in combination with a low output signal from comparator 15 makes the OR-gate 25 to deliver a low output signal stopping tone generator 26. During this time of 2.5 minutes, the hot plate is allowed to cool down so that the alarm is not repeated provided that the hot plate is switched off. However, if the hot plate would still be switched on, the alarm is repeated after 2.5 minutes since the output from mono flip-flop 20 then becomes low and comparator 14 again can deliver a high signal on its output. However, the alarm may also be repeated before that if the temperature would reach such a high level that comparator 15 on its output delivers a high signal since the tone generator 26 via OR-gate 25 then receives a start signal at the same time as the output from flip-flop 23 is low and accordingly causes tone generator 26 to operate with high effect.

The design with the two control circuits 12 and 13 operating in parallel accordingly enables the important advantage that two different alarm levels are established, the lower of which due to control circuit 12 may be inactivated by the user for a certain predetermined time period whereas, on the contrary, the higher represented by control circuit 13 always guarantees alarm function if the temperature condition would exceed the established higher level.

The switching off-delaying member 33 in control circuit 13 ensures that alarm is given during a certain minimum time if a short duration flame would appear.

Furthermore, an important characteristic of control device 10 is that the first control circuit 12 due to the component 23, e.g. in the form of the flip-flop described, is adapted to control the alarm emission to initially have a low level and after a certain time period a high level or alternatively a successively increasing level, whereas control circuit 13, which enters into operation at higher temperatures, always gives rise to a high level of the alarm emission.

Figure 5:
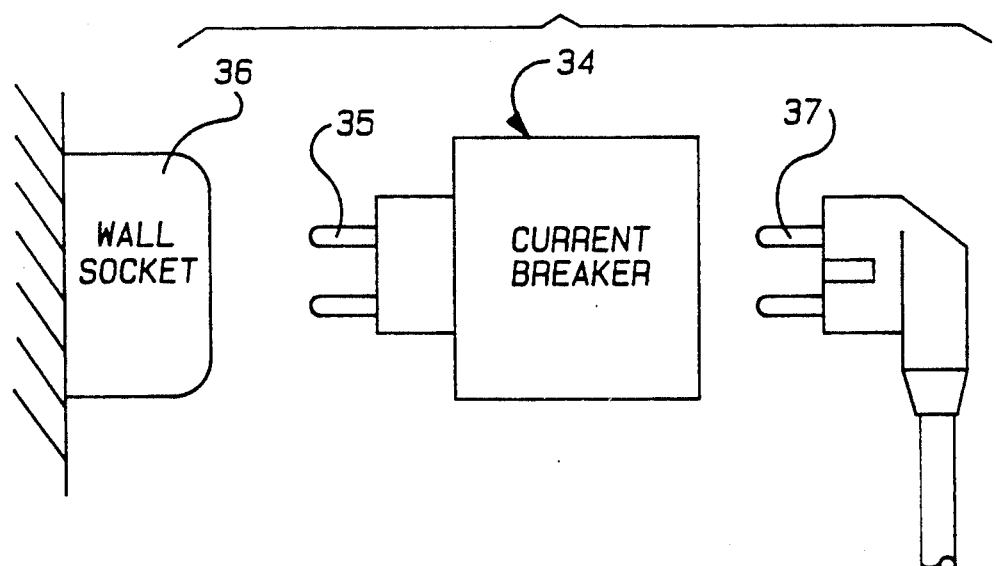
FIG. 5 is a diagrammatical view illustrating the design of a device for breaking the normal current supply to the supervised object.

A possible design of a device 34 for breaking the current supply to the stove or otherwise the object in question is illustrated in FIG. 5. The device 34 has the character of a plug-in unit with coupling elements 35 fitting into a conventional wall socket 36. Furthermore, the device 34 has female coupling elements for receiving coupling elements 37 on the plug normally belonging to the stove or the like. Accordingly, it will be very easy for the user to apply himself the breaking device 34. However, the breaking device 34 may of course be designed for fixed mounting, in which case authorized installation personnel would have to be utilized to.

Figure 6:
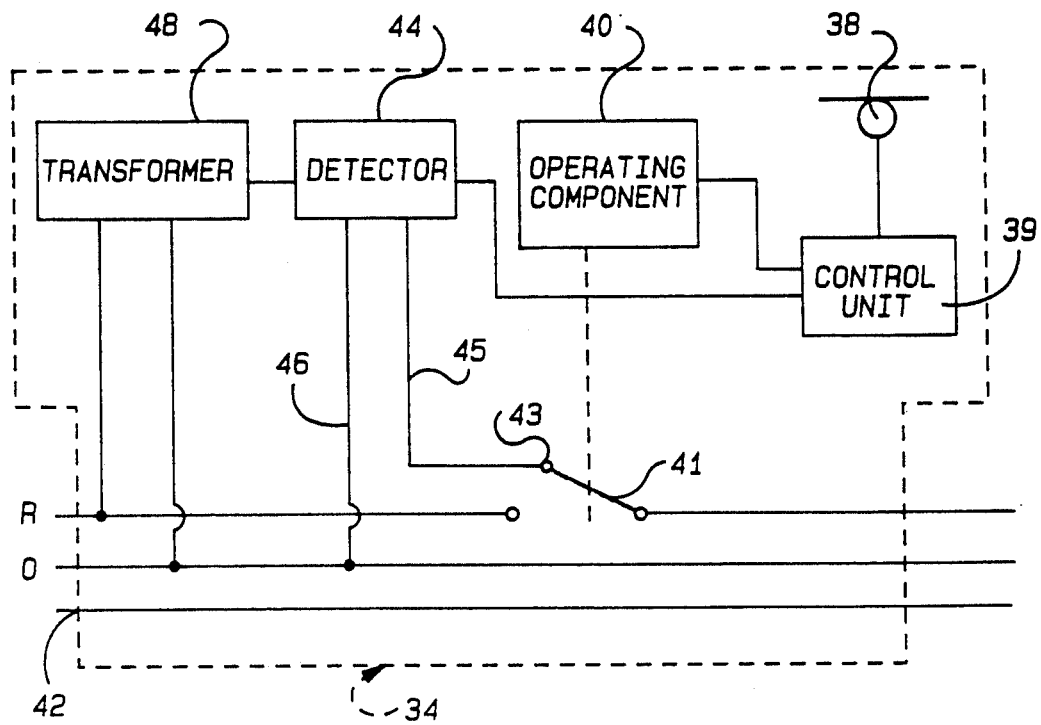
FIG. 6 is an elementary diagram over the design of the breaking device in FIG. 5.

The structure of the breaking device 34 is diagrammatically illustrated in FIG. 6. It comprises in the embodiment a microphone 38 adapted to wirelessly receive the alarm signals transmitted by the alarm transmitter 11. The microphone 38 is connected to a control unit 39, which when the microphone receives alarm signals controls an operating component 40 to actuate a breaker 41 so that the current supply to the stove or the like is interrupted. A one phase system with the phase R,O-conductor and earth 42 is indicated in the embodiment. Breaking may for instance occur after a certain number of alarm signals or after a certain alarm duration.

At the same time the breaker 41 interrupts the current supply, it is laid on to a contact 43 connected to a detector 44 via a conductor 45. The detector is connected to the 0-conductor via a second line 46. Detector 44 is so arranged and controlled by for instance control unit 39 that it transmits detection signals on the conductor 45 or 46 when the breaker 41 has interrupted the current supply to the stove. The stove or the like comprises a number of switches on its own for the user thereof to be able to switch off and on hot plates, oven etc. When all own switches of the stove are off, all current circuits in the stove are interrupted but if any of the switches of the stove would be on, there is in the stove a current circuit, which causes a detection current to flow in the conductors 45, 46 of the detector. The detector is so arranged that it controls the breaker device to maintain the current supply to the stove or the like interrupted as long as there is a closed current circuit in the stove or the like. Thus, in order to be able to use the stove, the user must turn off all of the switches of the stove, which is detected by the detector in that no current flows any longer in the conductors 45, 46. The detector 44 then delivers, via the connection, a signal to the control unit 39, said control signal causing control unit 39 to control operating member 40, e.g. an electromagnet, to close the current circuit to the stove which then again is in condition for use. From that stated it appears that operating member 40 suitably is of a bistable type.

The device 34 may obtain energy for driving components 38, 39, 40 and 44 from a battery or the like but it is also possible to arrange, as indicated in FIG. 6 at 48, a transformer with rectifiers for supplying energy to the components of device 34, said transformer being via conductors connected to and supplied from the power conductors of the stove.

In a three-phase circuit the embodiment is of course basically the same, with the only difference that detector 44 then applies detection signals on all three phases.

Instead of using a microphone in the embodiment according to FIG. 6, control device 39 could of course be arranged to receive signals from the IR-detector via conductors.

Figure 7:
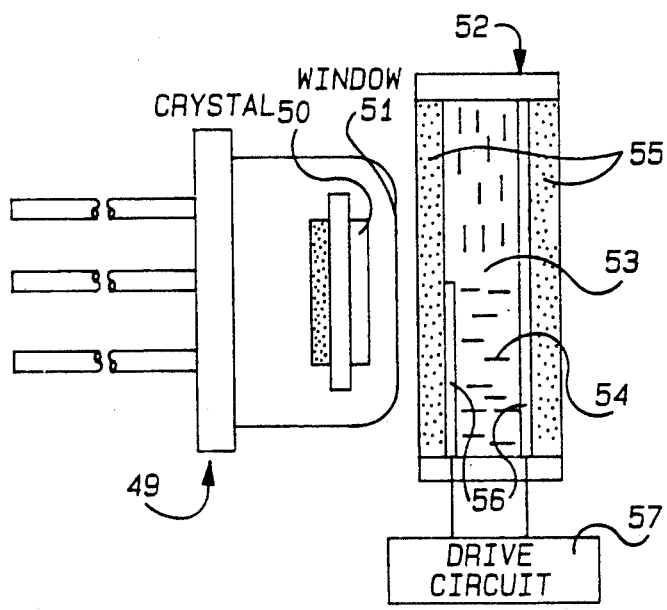
FIG. 7 is a diagrammatical view of a detector device.

A so called pyroelectric detector 49 is very diagrammatically illustrated in FIG. 7. Such a detector is more specifically of the type adapted for detecting relatively rapid temperature variations. The functional theory is based upon spontaneous polarization of a crystal 50 of $LiTaO_3$ in a dark state. The crystal surface is always electrified but is neutralized by ions in the air. When infrared light enters through a window 51 in a housing of the detector and meets the crystal and is absorbed thereby, the crystal temperature is increased, which results in a change of the spontaneous polarization state. This change is obtained on an output as a voltage change. Since the pyroelectric detector detects infrared light only when a temperature change occurs in the $LiTaO_3$ crystal, the detector cannot be directly used for measuring on stationary objects subject to of relatively slow temperature changes.

Since pyroelectric detectors of this type are very advantageous concerning price and measuring performance, it is proposed as indicated in FIG. 7 to arrange ahead of the window 51 of the detector 49 a screen of the type with liquid crystals, for which screen 52 there is arranged an electrical drive circuit 57 to drive the screen to alternatingly shield off the detector 49 from and expose the detector to IR-radiation from the object in question. In the liquid crystal screen 52 there is contained a liquid crystal cell 53 comprising liquid crystals diagrammatically indicated at 54. The LC-cell comprises plates 55 of glass or other transparent material and there are electrodes 56 in the cell to electrically orientate crystals so that they either cause passing through of IR-radiation or alternatively blockage against passage of such radiation. The screen 52 is of a transparent design and the passage of IR radiation is blocked substantially only when the liquid crystals are orientated to obtain such blocking. LC-screens or displays are well known per se and it is to be understood that any such screens may be used provided that they fulfill the conditions to, on one hand, sufficiently allow passage of IR-radiation, and, on the other hand, block such radiation.

The advantage in using such an LC-screen is that it has a statical nature and may be realized at a very low cost. By arranging the LC-screen, the pyroelectric detector 49 will in practice measure the temperature difference between the measured object and the back side of the LC-screen. The detector 49 and screen 52 may of course be integrated into a structural unit.

It is suitable to drive screen 52 with a frequency between 1 and 1000 Hz.

Figure 8:
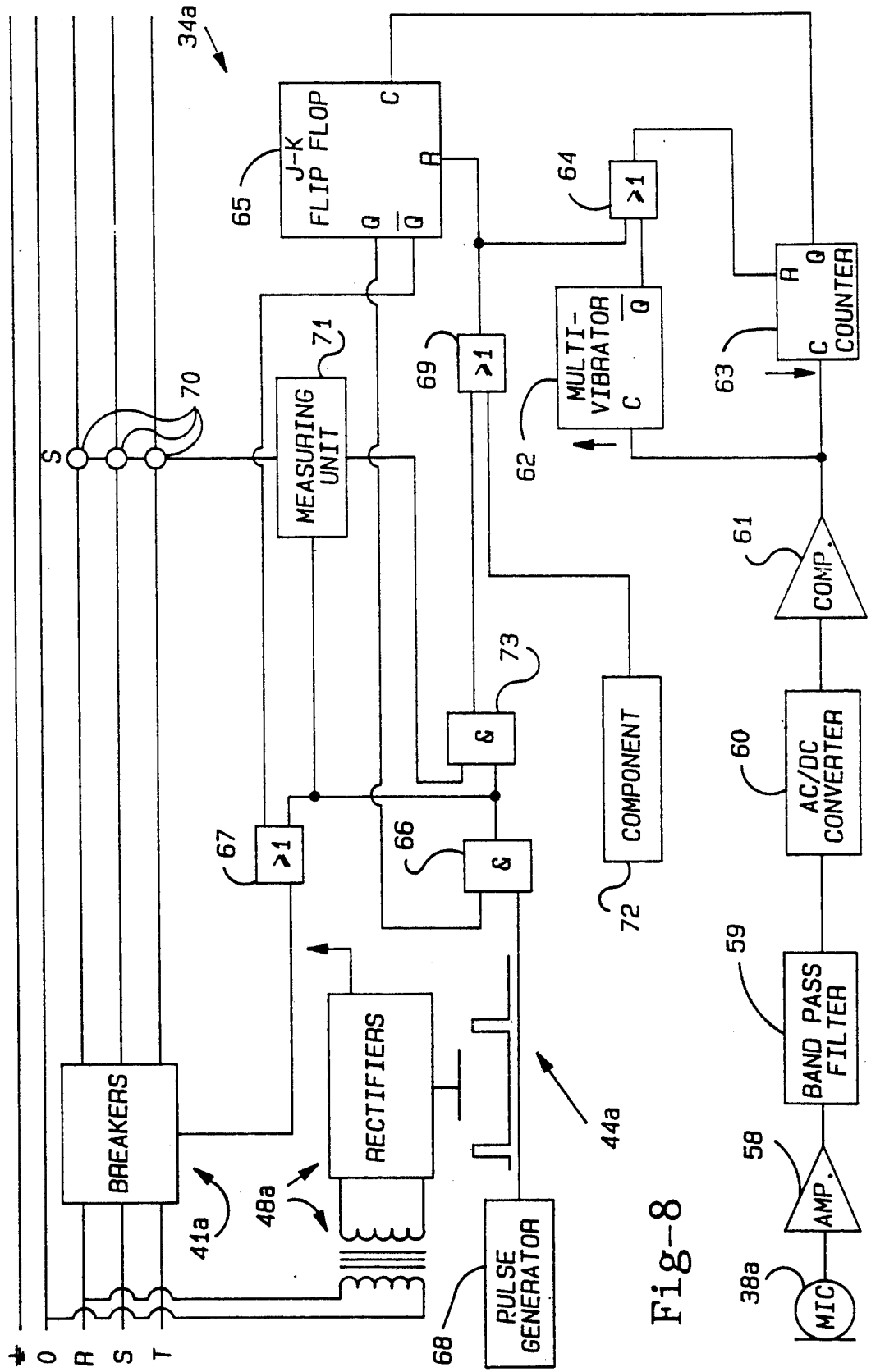
FIG. 8 is a diagram illustrating an alternative to the embodiment according to FIG. 5.

In the alternative illustrated in FIG. 8 to the embodiment in FIG. 6, the same reference characters as in FIG. 6 are used as far as possible with the addition of "a". Advanced electrical stoves are often provided with electrical or electronical components, for instance timers etc, causing one or more closed current circuits in the stove even if the other switch or switches of the stove which give rise to such overheating conditions which are to be detected in accordance with the present invention are open. In order to avoid that such current circuits to auxiliary components in the stove give rise to erroneous detection result, it is in the embodiment according to FIG. 8 proposed to use, as detection signals during relatively short time periods, the ordinary supply current in the supply conductors of the stove. In this way the detection signals will become substantially higher than the relatively small currents flowing through the auxiliary components of the stove and not controlled by the switches of the stove, which switches may give rise to overheating conditions. The stove in FIG. 8 is intended to be supplied by three-phase conductors R, S and T, the usual 0- and earth conductors also being provided.

The breaker device 34a comprises a microphone 38a to receive sound signals from the alarm device 11. The signals from the microphone pass via an amplifier 58, a bandpass filter 59, which is tuned to the sound signal from the alarm device 11, and an AC/DC converter 60 to a comparator 61. The latter compares the signals from microphone 38a with a reference. The output from the comparator is connected to an input of a monostable multivibrator 62 and a counter 63. The output from multivibrator 62 is connected to an input of an OR-gate 64, the output of which is connected to the reset input R of counter 63.

The output Q from counter 63 is connected to the clock input C of a J-K flip-flop 65. The output Q thereof is connected to an input of an AND-gate 66 whereas the output $\bar{Q}$ is connected to an input of an OR-gate 67. The output thereof is coupled to a breaker device 41a, which for instance may be realized by means of triacs provided in the supply conductors R, S, T. A pulse generator 68 delivers on its output to the AND-gate 66 pulses separated in time and the output of gate 66 is connected to an input of both OR-gate 67 and an AND-gate 73. The output thereof is connected to the input of an OR-gate 69, the output of which is connected, on one hand, to an input of OR-gate 64 and, on the other hand, to a reset input of flip-flop 65.

Coils 70 are adapted to inductively measure the current flowing to the stove through the supply conductors R, S. T. A measuring unit 71 receives on an input the induced alternating voltage from coils 70. An input of measuring unit 71 is connected to an output from gate 66 and an output from unit 71 is connected to an input of gate 73. The entire device 34a may obtain energy for driving inherent components from batteries or the like but it is also possible, as indicated in FIG. 8 at 48a, to provide a transformer with rectifiers for delivering energy to the components of device 34a, the transformer being via conductors connected to and obtaining supply from a supply conductor to the stove. A component 72 is adapted to provide for switching on of voltage (alternatively mounting of device 34a) resetting of counter 63 and JK flip-flop 65, more specifically by delivering on its output a signal to an input of gate 69.

The device 34a described operates in the following way: When device 11 (FIG. 4) emits alarm as to a condition of overheating, the sound is received by microphone 38a. When the rectified signal to comparator 61 exceeds an established reference level, comparator 61 turns from 0 to 1 on the output. The reference level may for instance be so adjusted that comparator 61 turns over when device 11 conditioned by control circuit 13 gives alarm at the higher level. When the sound signal ceases, the output of comparator 61 goes again from 1 to 0.

When the output 61 of the comparator goes from 0 to 1, the monostable multivibrator 62 is triggered so that its output goes from 1 to 0 during a short time. The output from the multivibrator 62 then goes via OR-gate 64 to the reset input of counter 63. The counter then starts to count and receive clock signals on its input C. The time function of multivibrator 62 is so adjusted that if individual sound signals would pass from the microphone to the output of comparator 61, the next sound signal must appear within the time for about two sound signals from alarm device 11. This is for avoiding that the counter 63 stores isolated sound signals during a longer time and thereby interrupts the current to the stove.

The counter 63 is reset when input R receives 1. The counter then counts up one step when input C goes from 1 to 0. When the counter has counted up a predetermined number of times, e.g. about 30 (corresponding to the same number of sound signals from alarm device 11) the output Q goes from 0 to 1, which causes triggering of flip-flop 65. Its output Q now goes from 0 to 1 and output $\overline{Q}$ from 1 to 0. The $\overline{Q}$ output is 1 in the normal state of device 34a, i.e. when normal or ordinary current supply to the stove occurs. The $\overline{Q}$ output then gives 1 via OR-gate 67 to the triacs, which with 1 on their input allow current to pass to the stove.

When the output Q of flip-flop 65 is 1, i.e. when the ordinary stove current supply, which may cause overheating conditions, has been interrupted, the current is again switched on during short periods separated in time by means of pulse generator 68, which via gates 66 and 67 delivers 1 to the triacs so that during said periods the current supply to the stove is closed by means of the triacs and current measurement may be carried out by means of the coils 70. The switching on of current by means of triacs 41a during these short time periods forms accordingly the detection signals, by means of which, with the assistance of coils 70 and measuring unit 71, it is established if there are any closed current circuits in the stove which again could give rise to overheating conditions. It should be mentioned that measuring unit 71 is so adjusted that it only reacts to currents of such size which occur when triacs 41a close the current supply, i.e. that the small currents which feed auxiliary components, such as timers, clocks or the like, are not considered.

The time interval (e.g. 6 seconds) between the pulses generated by pulse generator 68 is substantially greater than the duration of a pulse so that accordingly breaker device 41a in order to carry out detection closes the current supply under such a short proportion of the total time that no hazardous heating of the hot plates and/or oven of the stove can occur.

The measuring unit 71 generates 1 on the output connected to gate 23 if the stove is switched off (when the current in the stove is low or 0). The measuring unit 71 operates when the input from gate 66 is 1 and the stove is switched off, the output to gate 23 is then 1.

When device 34a is in measuring state, the measuring time is accordingly controlled by pulse generator 68. The measurement proceeds as long as the output from measuring unit 71 to gate 68 is 0. When the switches of the stove for regulating the current supply to hot plates and/or oven are switched off, a 1 will be generated on the output from measuring unit 71 connected to gate 73 and simultaneously 1 will be generated from pulse generator 73 via gate 66 to gate 68 and this causes together with 1 from the measuring unit 1 on the output from gate 73, which via gate 69 resets flip-flop 65 and via gate 64 counter 63.

When the flip-flop 65 is reset, 1 on its output $\overline{Q}$ is obtained and triacs 41a close for ordinary continuous or lasting current supply to the stove.

The apparatus may of course be modified in several ways within the scope of the invention. As an example it should be mentioned that the invention in no way is limited to the supervising of objects in the form of electrical stoves. Instead, the objects may be formed by various objects, such as machines, apparatus and instruments, where current supply may cause an overheating condition. It is not necessary that the temperature increase to be detected occurs in a directly electrical way. As an example it can be mentioned the operation case that an electrical motor powers a mechanical device. The temperature detector may then be adapted to detect overheating conditions in bearings or other members of this mechanical device and give rise to indication, alarm and/or breaking of energy supply to the electrical motor so that thereby the power supply to the drive of the mechanical device ceases. The circuit solutions described with the assistance of FIG. 6 and 8 could in such a case be arranged to detect whether a contactor in the supply of the electrical motor is closed or open and to maintain, by means of a breaker device, the current supply to the motor interrupted until it has been established that the contactor has been opened so that an overheating condition does not appear again.

We claim:

1. An apparatus for supervising an object, such as a hot plate or an electrical stovetop, with regard to overheating, said apparatus comprising:

at least one detector for detecting the temperature of said object to generate output signals indicative of said temperature;

an alarm device for delivering an alarm;

an electrical control for activating said alarm device in response to said output signals from said detector, said electrical control comprising at least a first control circuit responsive to said output signals to activate said alarm device at a first temperature level of said object, and a second control circuit responsive to said output signals to activate said alarm device at a second temperature level, higher than said first temperature level, said first control circuit being manually deactivatable by a user, said second control circuit will always activate said alarm device when said output signals from said at least one detector indicate that said second temperature level has been reached independent of whether said user has deactivated said first control circuit;

said first control circuit further includes a time delay circuit responsive to said deactivation of said first control circuit by said user, to maintain said deactivation of said first control circuit for a predetermined time period, said time delay circuit reactivating said first control circuit after the expiration of said predetermined time period; and said at least one detector being a pyroelectric IR-detector of the type adapted to detect relatively rapid temperature variations, characterized in that said apparatus comprises a screen spaced ahead of said detector and being of the type having liquid crystals and an electrical drive circuit to drive said screen to alternatingly screen off said detector from IR-radiation from said object and expose said detector to said IR-radiation.

2. An apparatus for supervising an object, such as a hot plate or an electrical stovetop with regard to overheating, said object comprising at least one user controlled on/off switch for said object, said apparatus comprising:

at least one detector for detecting overheating;

a breaker device controlled by said detector for interrupting the electrical current supply to said object in response to said detector detecting overheating; and a second detector for detecting whether said at least one user controlled on/off switch is closed or open after said supply of energy to said object has been interrupted by means of said breaker device, said second detector providing signals on the conductors supplying current to said object for establishing whether any current circuit in said object is closed by said at least one user controlled on/off switch being closed, said second detector having means for controlling said breaker device to maintain said energy supply to said object interrupted until it has been established that said at least one user controlled on/off switch is open and then to deactivate said breaker device to re-establish said energy supply to said object.

3. An apparatus according to claim 2, characterized in that said detector comprises means to repeatedly and briefly close said current supply to said object by means of breaker members and means for detecting such repeated, brief closing gives rise to such flow of electrical current in said object which indicates said at least one user controlled on/off switch is closed.

4. Apparatus according to claim 2, wherein said at least one detector is a pyroelectric IR-detector capable of detecting relatively rapid temperature variations, characterized in that said apparatus comprises a screen spaced ahead of said at least one detector and being of the type having liquid crystals and an electrical drive circuit to drive said screen to alternatingly screen off said at least one detector from IR-radiation from said object and expose said at least one detector to such IR-radiation.

* * * * *